Feb. 1, 1966 J. A. DARKE 3,233,120

TRANSISTOR TRIGGER-PULSE CIRCUIT

Filed March 14, 1962 2 Sheets-Sheet 1

Feb. 1, 1966 J. A. DARKE 3,233,120

TRANSISTOR TRIGGER-PULSE CIRCUIT

Filed March 14, 1962 2 Sheets-Sheet 2

United States Patent Office 3,233,120

Patented Feb. 1, 1966

3,233,120

TRANSISTOR TRIGGER-PULSE CIRCUIT

James Anthony Darke, Rugby, England, assignor to Associated Electrical Industries Limited, London, England, a British company Filed Mar. 14, 1962, Ser. No. 179,569
Claims priority, application Great Britain, Apr. 19, 1961, 14,146/61
12 Claims. (Cl. 307—88.5)

This invention relates to electronic circuits. It is concerned with a circuit for providing trigger pulses commencing at a controllable phase relative to an A.C. supply and has application in firing circuits for semiconductor controlled A.C. rectifiers. Circuits in accordance with the invention may be arranged as half-wave circuits, that is, to provide a trigger pulse in each cycle, or else may be arranged as a full-wave circuit to provide two trains of trigger pulses each train commencing at corresponding phases relative to alterative half-cycles of an A.C. supply.

According to the present invention, an electronic circuit adapted to provide trigger pulses suitable for the control of a controlled rectifier, comprises a transistor arranged as a blocking oscillator and arranged to produce a train of pulses during part of each half-cycle, or during part of each alternate half cycle, of an A.C. supply to the controlled rectifier, the pulse repetition frequency being many times that of the A.C. supply, and the operation of the blocking oscillator being controlled by a ramp waveform derived from the A.C. supply and by a controllable D.C. bias, whereby the blocking oscillator will commence to produce a train of trigger pulses at a point in each of the said half cycles determined by the phase of the A.C. supply and by the value of the D.C. bias, and this point can be varied by variation of the D.C. bias.

The invention will now be described, by way of example, with reference to the accompanying drawings in which.

Figure 1:
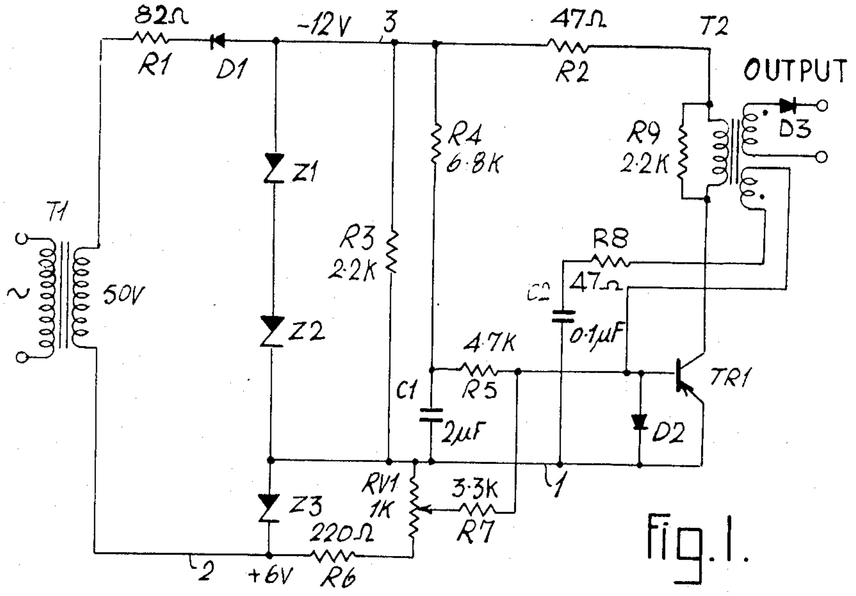
FIGURE 1 is a circuit diagram of a half-wave firing circuit.

Referring now to FIGURE 1, the circuit illustrated therein comprises a blocking oscillator including a transformer T2 and a transistor TR1 of type XC 101 which is fed from the secondary winding of a power transformer T1 across the primary winding of which is applied an A.C. power supply. The output of transformer T1 is 50 volts A.C. and is rectified by means of a half-wave rectifier D1 in series with a resistor R1 of 82 ohms and is applied across a series chain of three Zener diodes Z1, Z2 and Z3. The junction between diodes Z2 and Z3 energises the common supply line 1 of the circuit and may be earthed if so desired. The remaining terminal of diode Z3 energises a positive bias line 2 and the remaining terminal of diode Z1 energises a negative bias line 3. The positive bias line 2 is at +6 volts, the negative bias line is at −12 volts, and the line 1 is at zero volt. The negative bias line 3 is connected through a series connected resistor R2 of 47 ohms and the primary winding of transformer T2 to the collector of transistor TR1, and the emitter of this transistor is connected to the supply line 1. A feedback winding of transformer T2 is connected in series with a resistor R8 of 47 ohms and a capacitor C2 of 0.1 microfarad between the base and the emitter of transistor TR1, across which is also connected a rectifier D2.

Transistor TR1 is controlled by means of a circuit comprising a capacitor C1 of 2 microfarads and resistor R4 of 6,800 ohms connected in series between supply line 1 and negative bias line 3, this series combination being bridge by a resistor R3 of 2,200 ohms. The potential across capacitor C1 is applied through a resistor R5 of 4,700 ohms to the base of transistor TR1. In addition, a series combination of a potentiometer RV1 of 1,000 ohms and a resistor R6 of 220 ohms is connected between supply line 1 and the positive bias line 2, and the slider of this potentiometer is connected through a resistor R7 of 3,300 ohms to the base of transistor TR1. Thus resistors R5 and R7 provide a mixing circuit for the negative ramp potential across capacitor C1 and a positive D.C. control voltage from the slider of potentiometer RV1. The combined signal is applied between base and emitter of transistor TR1.

Figure 3:
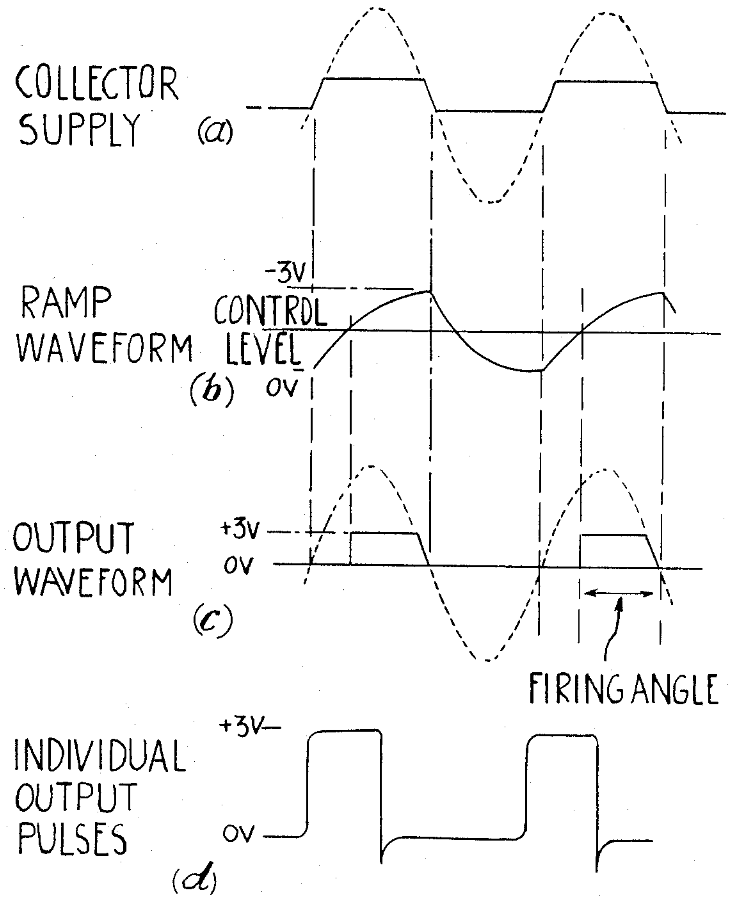
FIGURE 3 shows waveforms occurring in various parts of the circuit of FIGURE 1.

The combination of the Zener diodes Z1 to Z3 and the rectifier D1 provides a negative potential for the collector of transistor TR1 which is in the form of a clipped half-sine wave, illustrated at (*a*) in FIGURE 3. Thus, the power supply of the blocking oscillator is substantially constant over the major part of alternate half-cycles of the supply. It will be appreciated that, due to the feedback from transformer T2 to the base of transistor TR1, during the time when negative potential is applied to the transistor the blocking oscillator will function automatically to provide a train of pulses across its output winding provided that there is sufficient negative bias on the base of transistor TR1.

The bias supply for transistor TR1 is provided by a negative-going ramp waveform illustrated at (*b*) in FIGURE 3, which is generated in the negative half-cycles of the supply by capacitor C1 charging through resistor R4. During the remaining half-cycles of the supply, this capacitor discharges through resistor R3. The ramp waveforms derived from capacitor C1 is mixed by resistors R5 and R7 with a positive bias of controllable magnitude derived from the setting of potentiometer of RV1. Thus, at the beginning of each negative half-cycle transistor TR1 is cut off and the blocking oscillator does not function. However, as the negative charge across capacitor C1 increases, a condition will be reached at which transistor TR1 will conduct and oscillations will commence as illustrated at (*c*) in FIGURE 3. This instant in the half-cycle will be determined by the setting of the potentiometer RV1. The individual pulses of each train appear as at (*d*) in FIGURE 3.

The purpose of the diode D2 between the base and emitter of transistor TR1 is to improve the stability of the circuit in different ambient temperatures by providing a low impedance path for the transistor leakage current when the base is positive. A resistor R9 is connected across the primary winding of transformer T2 to discharge the energy stored in the winding at the end of a pulse and thus prevent excessive induced collector voltages on the transistor. Also, a diode D3 is connected in series with the output winding of transformer T2 to prevent reverse trigger current flowing. It also assists commencement of oscillations in the blocking oscillator by operating as a high impedance load until the output pulse voltage has risen above the forward drop of the rectifier.

The pulse length and the repetition frequency of the blocking oscillator are governed largely by the characteristics of the transformer T2. In one practical embodiment of circuit of FIGURE 1, the pulse length was approximately 25 microseconds, the mark/space ratio was approximately 1.2, and the pulse repetition frequency approximately 13,000 cycles per second, all these values varying slightly with the load on the output. The amplitude of each pulse corresponded to an open circuit voltage of 6 volts and a short circuit current of 0.4 amp.

It will be appreciated that the oscillator will continue to deliver a series of pulses until the end of the half-cycle and the pulse length, and repetition frequency of these pulses depend largely on the properties of the transformer. An advantage of using a blocking oscillator to trigger a controlled rectifier is that, while normally the first pulse from the oscillator will be sufficient to fire the rectifier, if the operating point of the rectifier is on the rising slope of its anode voltage, and it does not trigger immediately on the first pulse, the subsequent pulse should ensure firing with practically no delay as the anode voltage rises.

The range of adjustment of the firing angle obtained with the circuit of FIGURE 1 is between 20 and 160 degrees. By the use of suitable phase-shift circuits previous to transformer T1, this range can be shifted bodily either way as long as the rectifier anode voltage is high enough for the rectifier to operate.

Figure 2:
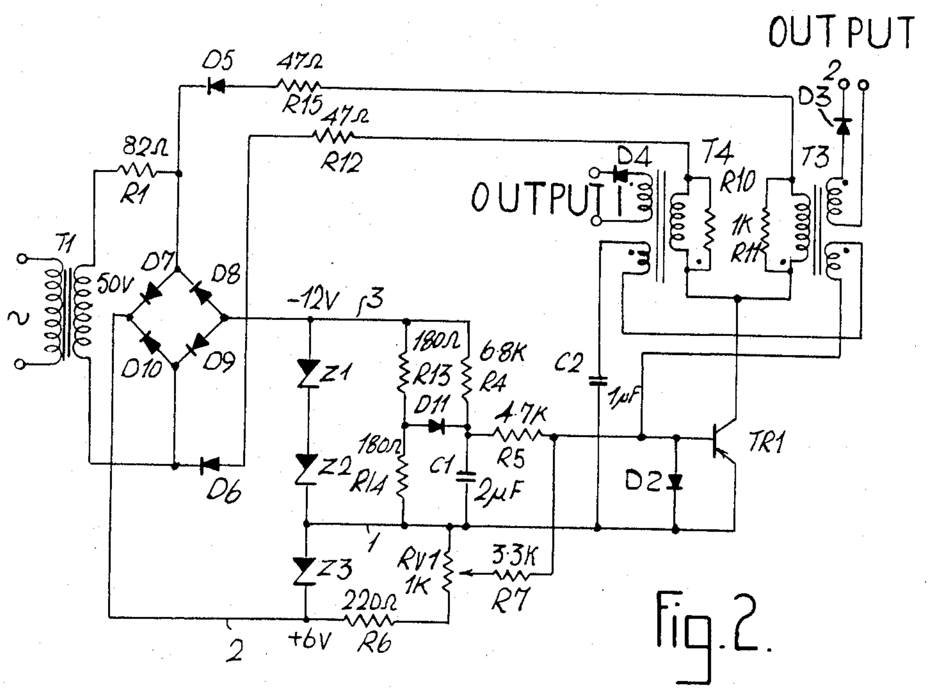
FIGURE 2 is a circuit diagram of a full-wave firing circuit.

A full-wave circuit which provides two trains of trigger pulses each train being of corresponding phase relative to alternate cycles of an A.C. supply is illustrated in FIGURE 2, in which like parts have like reference numerals to the circuit of FIGURE 1. In this circuit the operating potential and the control voltage are derived from separate rectifying circuits, and the output of power transformer T1 is applied to the collector of transistor TR1 along two parallel paths connected to opposite ends of the secondary winding of transformer T1. Each path provides a negative bias in alternate half-cycles of the A.C. supply. One of the paths comprises a diode D5 in series with a resistor R15 and feeds the transistor through the primary winding of a blocking oscillator transformer T3 and the other path comprises a diode D6 in series with a resistor R12 and feeds the transistor through the primary winding of a further blocking oscillator transformer T4.

The control circuit for applying a ramp waveform to the base of transistor TR1 is derived from a bridge rectifier circuit comprising four rectifiers D7, D8, D9 and D10 connected across the secondary winding of the transformer T1 and which supplies a negative bias line 3 and a positive bias line 2 as before. The ramp waveform is obtained from the charging of capacitor C1 in successive half-cycles through resistor R4 as before. However, the discharge path for capacitor C1 at the end of each half-cycle now comprises two resistors R13 and R14 in series in place of resistor R3. Furthermore, a diode D11 is connected between the junctions of resistors R13 and R14 and the junction of capacitor C1 and resistor R4. This diode ensures rapid discharge of capacitor C1 in the short time available between successive half-cyles of the supply. It should be noted that the two feedback windings of blocking oscillator transformers T3 and T4 are connected in series with each other and capacitor C2 between the base and emitter of transistor T1, while resistor R8 is dispensed with.

An important advantage of the above arrangement is that since the same transistor is used to generate both trains of trigger pulses, the phase of each of the trains will be identical to a high degree of accuracy.

Figure 4:
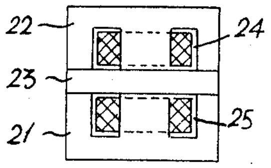
FIGURE 4 illustrates a construction of a transformer used in the circuit of FIGURE 2.

Transformers T3 and T4 can be separate, but if desired they can be wound as a composite construction in the form illustrated in FIGURE 4. In this arrangement, two E-shaped cores 21 and 22 are separated by a plate core 23 to define two separate annular spaces 24 and 25. In one of these spaces 24 there can be inserted the windings of transformer T3 wihle the windings of the other transformer T4 can be inserted in the other space 25.

The maximum range of control over each half-cycle of the supply depends to some extent on the parameters of the power supply and with the component values given, the range is about 20 to 160°. This range can be extended by increasing the voltage of the secondary winding of transformer T1 at the expense of increased power dissipation in the Zener diodes. This can be compensated to some extent by increasing the value of resistor R1 at however the cost of a decrease in the maximum range that would otherwise be obtained. It may be possible to obtain a small improvement in the range of firing angles by putting a capacitor of, say 2 microfarads across the Zener diodes Z1 and Z2.

With the given component values, the voltage to which capacitor C1 will charge in a half-cycle, which depends on the time constant of the combination of resistor R4 and capacitor C1, is about −3 v. Reducing this time constant will increase the amplitude of the ramp waveform thus improving the temperature stability of the circuit at the expense of linearity and sensitivity. Conversely, increasing this time constant gives the reverse effect.

If it is desired to provide automatic voltage control of the output of the controlled rectifier, this can be achieved by replacing the manual control by potentiometer RV1 with an automatic control sensitive to the output voltage of the controlled rectifier. Thus the phase of commencement of oscillations can be controlled from a separate D.C. amplifier by omitting the components diode Z3, resistor R6 and potentiometer RV1 and feeding the output of the amplifier directly to resistor R7. With the component values indicated, a swing of +1.5 v. to +3.5 v. is required.

In the case of the half-wave circuit in FIGURE 1, resistor R2 can be in series with the output and have a value of about 12 ohms. This allows the output to be short-circuited without stopping the oscillations.

Resistor R8, if made variable, provides a fine adjustment of the amount of feedback in the blocking oscillator and can thus control the output pulse width and shape.

In the embodiments of the invention described above, the transistor is fed from an A.C. source (transformer T1) energised by the A.C. supply to the controlled rectifier.

However, the circuits shown can be modified so that the operating potential for the transistor is provided by a constant voltage D.C. source. It is necessary that the ramp waveform shall be derived from the A.C. supply, in order that it shall remain in an exact phase relationship to the A.C. supply to the controlled rectifier.

When a constant voltage D.C. source is used to energise the transistor, each train of trigger pulses produced by the blocking oscillator will continue, even although the A.C. supply has entered its negative half-cycle, until the ramp waveform signal has fallen to the control level and the transistor TR1 becomes cut-off. This means that the controlled silicon rectifier has the train of trigger pulses still applied to it simultaneously with a reversed A.C. supply voltage. This leads to losses in the controlled rectifier, with a consequent rise in temperature. However, if the pulses are of short duration, and the mark/space ratio is sufficiently low, the rise in temperature may not be excessively large.

What I claim is:

1. An electronic firing circuit suitable for triggering a controlled rectifier and comprising:

(a) a transistor having a base, an emitter and a collector;

(b) an alternating current supply having a main frequency in the order of 60 cycles per second;

(c) a first circuit fed by the alternating current supply and producing as output half-wave-rectified and clipped direct voltage;

(d) a second circuit fed by the alternating current supply and generating a fluctuating direct voltage of ramp waveform at the supply frequency;

(e) a third circuit producing a controllable direct current bias voltage during substantially the whole period of each alternate half cycle of the alternating current supply;

(f) a circuit fed by said second and third circuits and connected between said base and emitter by which the ramp waveform and the controllable direct current bias voltage are jointly applied between the base and the emitter to render the transistor conductive when the voltage of the ramp waveform over-rides the bias voltage;

(g) adjustable circuit means for varying the controllable direct current bias voltage so as to vary the point in each of the said alternate half cycles at which the transistor will become conductive;

(h) and an electrical network including the emitter and the collector of the transistor and forming a blocking oscillator, said network being fed with the half-wave-rectified and clipped voltage output of said first circuit and producing a train of output pulses in an output circuit during the part of each of the said alternate half cycles when the transistor is conductive, the pulse repetition frequency being several kilocycles per second.

2. An electronic circuit according to claim 1, in which the components of the electrical network are such that the operating frequency of the blocking oscillator is of the order of ten kilocycles per second.

3. An electronic circuit according to claim 1, in which the electrical network includes an output transformer having:

(a) a primary winding energised by the output of the transistor;

(b) a first secondary winding which provides the required train of output pulses; and (c) a second secondary winding which is connected into the network to apply feedback to the input of the transistor to cause oscillation.

4. An electronic circuit according to claim 3, in which rectifier means are connected to the first secondary winding and are effective to suppress pulse outputs during alternate half cycles of the E.M.F. induced in that secondary winding.

5. An electronic circuit according to claim 3, in which a discharging resistance of a high value is connected across the primary winding and is effective to discharge the energy stored in the winding at the end of a pulse without the application of excessive induced voltages to the transistor.

6. An electronic circuit according to claim 1, in which the collector of the transistor is connected through an output load and a rectifier to one side of the alternating current supply, and the transistor produces pulses during alternate half waves only of the alternating current supply.

7. An electronic firing circuit suitable for triggering a controlled rectifier and comprising:

(a) a transistor having a base, an emitter and a collector;

(b) an alternating current supply having a main frequency of the order of 60 cycles per second;

(c) a first circuit fed by the alternating current supply and generating a fluctuating direct voltage of ramp waveform at twice the supply frequency;

(d) a second circuit fed by the alternating current supply and generating a fluctuating direct voltage of ramp waveform at twice the supply frequency;

(e) a third circuit producing a controllable direct current bias voltage during substantially the whole period of each half cycle of the alternating current supply;

(f) a circuit fed by said second and third circuits and connected between said base and emitter by which the ramp wave form and the controllable direct current bias voltage are jointly applied between the base and the emitter to render the transistor conductive when the voltage of the ramp waveform over-rides the bias voltage;

(g) adjustable circuit means for varying the controllable direct current bias voltage so as to vary the point in each of the said half cycles at which the transistor will become conductive;

(h) and an electrical network including the emitter and the collector of the transistor and forming first and second blocking oscillators fed with the first and the second half-wave-rectified and clipped voltage of said first circuit and producing respectively a train of output pulses in a first output circuit during the part of each of the said alternate half cycles when the transistor is conductive and a train of output pulses in a second output circuit during the part of each of the said remaining half cycles when the transistor is conductive, the pulse repetition frequency in each circuit being several kilocycles per second.

8. An electronic circuit according to claim 7, in which the collector of the transistor is connected through two alternate output circuits, each containing an output load and a rectifier, to opposite sides of the alternating current supply, and the transistor produces pulses in one of the two output circuits during alternate half waves of the said supply and produces pulses in the other of the two output circuits during the remaining half waves of the said supply.

9. An electronic circuit according to claim 7, in which the components of the electrical network are such that the operating frequency of each blocking oscillator is of the order of ten kilocycles per second.

10. An electronic circuit according to claim 7, in which each blocking oscillator includes an output transformer having:

(a) a primary winding energised by the output of the transistor;

(b) a first secondary winding which provides the required train of output pulses; and (c) a second secondary winding which is connected into the network to apply feedback to the input of the transistor to cause oscillation.

11. An electronic circuit according to claim 10, in which rectifier means are connected to the first secondary winding and are effective to suppress pulse outputs during alternate half cycles of the E.M.F. induced in that secondary winding.

12. An electronic circuit according to claim 10, in which a discharging resistance of a high value is connected across the primary winding and is effective to discharge the energy stored in the winding at the end of a pulse without the application of excessive induced voltages to the transistor.

References Cited by the Examiner

UNITED STATES PATENTS

| | | | |
|---|---|---|---|
| 2,743,907 | 5/1956 | Christensen et al. | 331—71 X |
| 2,774,919 | 12/1956 | Coles | 331—71 X |
| 3,002,110 | 9/1961 | Hamilton | 331—112 X |
| 3,033,996 | 5/1962 | Atherton | 307—88.5 |
| 3,056,930 | 10/1962 | Berg | 331—112 X |

ARTHUR GAUSS, *Primary Examiner.*